United States Patent
Shikata

(10) Patent No.: US 7,688,350 B2
(45) Date of Patent: Mar. 30, 2010

(54) DIGITAL CAMERA APPARATUS AND PRINTING METHOD OF DIGITAL CAMERA APPARATUS

(75) Inventor: Yasuhito Shikata, Tokyo (JP)

(73) Assignee: Sony Corporation, Tokyo (JP)

( * ) Notice: Subject to any disclaimer, the term of this patent is extended or adjusted under 35 U.S.C. 154(b) by 1010 days.

(21) Appl. No.: 10/536,205

(22) PCT Filed: Oct. 8, 2003

(86) PCT No.: PCT/JP03/12884

§ 371 (c)(1),
(2), (4) Date: May 24, 2005

(87) PCT Pub. No.: WO2004/049707

PCT Pub. Date: Jun. 10, 2004

(65) Prior Publication Data

US 2006/0251415 A1    Nov. 9, 2006

(30) Foreign Application Priority Data

Nov. 26, 2002    (JP)    ............................. 2002-341770

(51) Int. Cl.
*H04N 5/225* (2006.01)
*H04N 5/228* (2006.01)

(52) U.S. Cl. .............................. 348/207.2; 348/208.16; 358/474; 358/302; 386/117

(58) Field of Classification Search .............. 348/207.2, 348/207.99; 358/296, 302, 474; 386/117
See application file for complete search history.

(56) References Cited

U.S. PATENT DOCUMENTS

| 4,772,945 A * | 9/1988 | Tagawa et al. .............. 348/155 |
| 4,893,258 A * | 1/1990 | Sakuragi ..................... 345/668 |
| 5,485,554 A * | 1/1996 | Lowitz et al. .............. 358/1.17 |
| 6,724,502 B1 * | 4/2004 | Miyake et al. .............. 358/474 |
| 2002/0034388 A1* | 3/2002 | Inadomi et al. ............. 396/429 |
| 2002/0071651 A1* | 6/2002 | Wurz et al. .................... 386/46 |
| 2003/0122934 A1* | 7/2003 | Shiohara .................. 348/207.2 |

(Continued)

FOREIGN PATENT DOCUMENTS

JP    04-334287    11/1992

(Continued)

*Primary Examiner*—Sinh Tran
*Assistant Examiner*—Hung H Lam
(74) *Attorney, Agent, or Firm*—Frommer Lawrence & Haug LLP; William S. Frommer; Thomas F. Presson

(57) ABSTRACT

A digital camera apparatus and a printing method for printing still and motion image stored in the digital camera. A frame to be printed in motion image data stored in a removable memory is designated. The position information of the designated frame to be printed is held in a memory. Upon printing, the motion image data is read out of the removable memory according to the stored position information and then still image data is formed from the motion image data of the frame specified by the frame position information in the motion image data. The formed still image data is sent to a printer through an interface. Since a still image of the image of the print frame is formed from the motion image and sent to the printer, the printer can print by a process similar to a printing process for the still image and execute the printing without being aware of a motion image format.

22 Claims, 4 Drawing Sheets

U.S. PATENT DOCUMENTS

| | | | |
|---|---|---|---|
| 2003/0193569 A1* | 10/2003 | Ogawa et al. | 348/207.2 |
| 2004/0080785 A1* | 4/2004 | Takahashi | 358/1.15 |
| 2004/0189692 A1* | 9/2004 | Tojo et al. | 345/723 |
| 2006/0087671 A1* | 4/2006 | Komatsu et al. | 358/1.13 |

FOREIGN PATENT DOCUMENTS

| | | | | |
|---|---|---|---|---|
| JP | 8-32911 | 2/1996 | | |
| JP | 9-139876 | 5/1997 | | |
| JP | 10-229490 | 8/1998 | | |
| JP | 10-229534 | 8/1998 | | |
| JP | 11-46331 | 2/1999 | | |
| JP | 11-55605 | 2/1999 | | |
| JP | 11-168684 | 6/1999 | | |
| JP | 2000-333123 | 11/2000 | | |
| JP | 2001-016491 | * 1/2001 | | 5/225 |
| JP | 2001-45431 | 2/2001 | | |
| JP | 2001-128095 | 5/2001 | | |
| JP | 2001-251573 | 9/2001 | | |
| JP | 2001-290612 | 10/2001 | | |
| JP | 2001-333363 | 11/2001 | | |
| JP | 2002-262149 | 9/2002 | | |
| JP | 2003-175657 | 6/2003 | | |

* cited by examiner

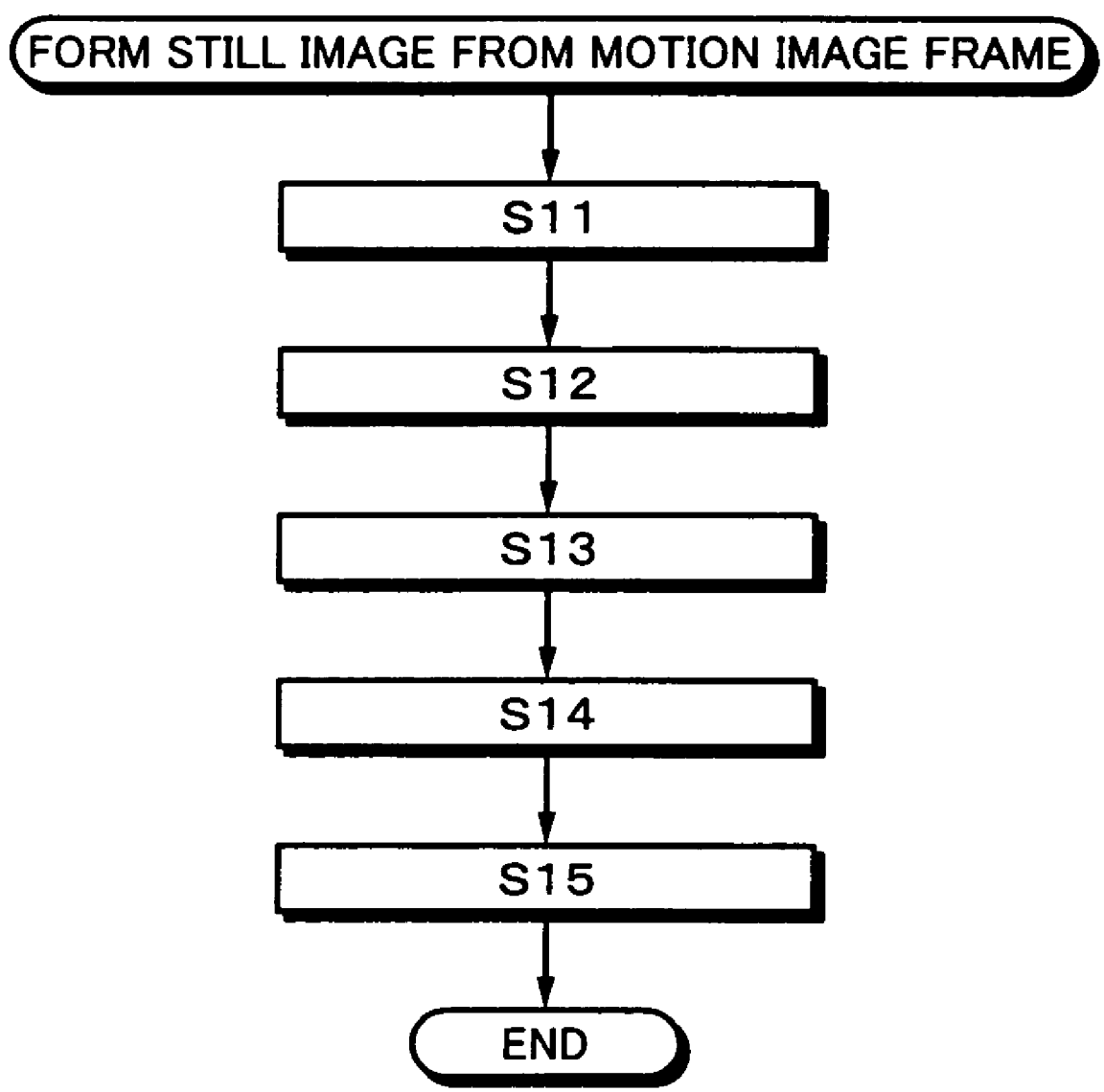

DIGITAL CAMERA APPARATUS AND PRINTING METHOD OF DIGITAL CAMERA APPARATUS

TECHNICAL FIELD

The invention relates to a digital camera which can photograph a still image and can photograph a motion image and, more particularly, to a method whereby a digital camera and a printer are directly connected and an image photographed by the digital camera can be directly printed by the printer.

BACKGROUND ART

In a digital camera, an image photographed by an image pickup device such as a CCD (Charge Coupled Device) or the like is stored in a detachable non-volatile memory such as a memory stick (registered trademark) or the like. The image which is stored in the non-volatile memory is ordinarily compressed by using a compression system such as JPEG (Joint Photographic Experts Group) or the like. In recent years, functions of the digital camera have been advanced and the camera which can photograph a still image and can also photograph a motion image has been proposed. In the digital camera which can photograph a motion image, the photographed motion image is compressed by, for example, MPEG (Moving Picture Coding Experts Group) system and stored in the non-volatile memory in a file format of MPEG.

As mentioned above, in recent years, the functions of the digital camera have been advanced and there is a camera which can photograph not only the still image but also the motion image. In such a digital camera, there is such a demand that the user wants to extract the image of a specific frame from the photographed motion image, print it by a printer, and enjoy it. In the case of printing the specific frame of the motion image photographed by the digital camera, the following two methods have been known hitherto.

(1) The motion image stored in the non-volatile memory is transferred to a personal computer, the motion image is transferred to a personal computer system to which a printer is connected, the frame which the user wants to print is selected while reproducing the image on the system, and the image is printed by the printer connected to the personal computer.

As a system in which the print frame is selected and printed by the printer itself, the system as shown in Patent Document 1 (JP-A-2001-78127) has been proposed.

(2) The print frame is selected on a monitor of a system (for example, digital camera) which photographed the motion image and information of the selected frame is used as print information and stored as another file into the non-volatile memory. Subsequently, the non-volatile memory is inserted into the printer and the image is printed.

As a system using such a method, the systems shown in Patent Document 2 (JP-A-2001-251573) and Patent Document 3 (JP-A-2000-333123) have been proposed.

With respect to direct printing of the motion image, the method of printing a video image of a digital video camera by using IEEE (Institute of Electrical and Electronics Engineers) 1394 has been proposed in Patent Document 4 (JP-A-2001-328314).

However, according to the method whereby the motion image stored in the non-volatile memory is transferred to the personal computer and printed by the printer connected to the personal computer or the method whereby the print frame is selected on the monitor of the system which photographed the motion image, the information of the selected frame is used as print information and stored as another file into the non-volatile memory, the non-volatile memory is inserted into the printer, and the image is printed, there is such a problem that the image data of the photographed image has to be transferred from the image pickup apparatus to another system and the motion image cannot be easily printed. The motion image frames which can be printed by those methods are limited to a specific motion image format in which the image data can be decompressed (decoded) on the printer side.

Therefore, it is demanded that the digital camera and the printer are directly connected and user can enjoy by easily printing a desired frame of the motion image photographed by the digital camera.

With respect to a system in which the digital camera and the printer are directly connected and the frame of the photographed motion image can be directly printed by the printer, the system shown in Patent Document 4 exists. However, in Patent Document 4, the method of printing the video image of the digital video camera by using IEEE1394 has been proposed and it is limited to use in a specific interface and the motion image format and it is lacking in generality.

It is, therefore, an object of the invention to provide a digital camera apparatus in which a digital camera and a printer are directly connected, a desired frame of a motion image photographed by the digital camera can be easily printed, and it does not depend on specific image format and interfaces and to provide a printing method of such a digital camera.

DISCLOSURE OF INVENTION

According to the invention, there is provided a digital camera apparatus comprising:

image pickup means for photographing an object image; and storing means in which photographed still image data and motion image data are stored, wherein the apparatus further has an interface for connecting to a printer, when the motion image data stored in the storing means is printed, the printer is connected through the interface, a frame to be printed in the motion image data stored in the storing means is designated, position information of the designated frame to be printed is stored, the motion image data is read out from the storing means on the basis of the stored position information of the frame, the still image data is formed from the motion image data of the frame which is specified by the frame position information in the motion image data, and the formed still image data is transmitted to the printer through the interface.

According to the invention, there is provided a printing method of a digital camera apparatus, whereby an object image is photographed and photographed still image and motion image data are stored in storing means, wherein an interface for connecting to a printer is provided, when the motion image data stored in the storing means is printed, the printer is connected through the interface, a frame to be printed in the motion image data stored in the storing means is designated, position information of the designated frame to be printed is stored, the motion image data is read out from the storing means on the basis of the stored position information of the frame, the still image data is formed from the motion image data of the frame which is specified by the frame position information in the motion image data, and the formed still image data is transmitted to the printer through the interface.

According to the invention, the digital camera and the printer are directly connected and the image photographed by the digital camera can be printed without using the personal computer. The apparatus has the functions for designating the image of the desired print frame from the motion image photographed by the digital camera, forming the still image of the image of this print frame, and sending it to the printer. Therefore, not only the still image but also the desired frame in the motion image can be printed. Since the still image of the image of the print frame is formed from the motion image and sent to the printer, the printer can print by a process similar to the printing process of the still image and can print without being aware of the motion image format.

BRIEF DESCRIPTION OF THE DRAWINGS

FIG. 4 is a flowchart which is used for explanation of the digital camera to which the invention is applied.

BEST MODE FOR CARRYING OUT THE INVENTION

Figure 1:
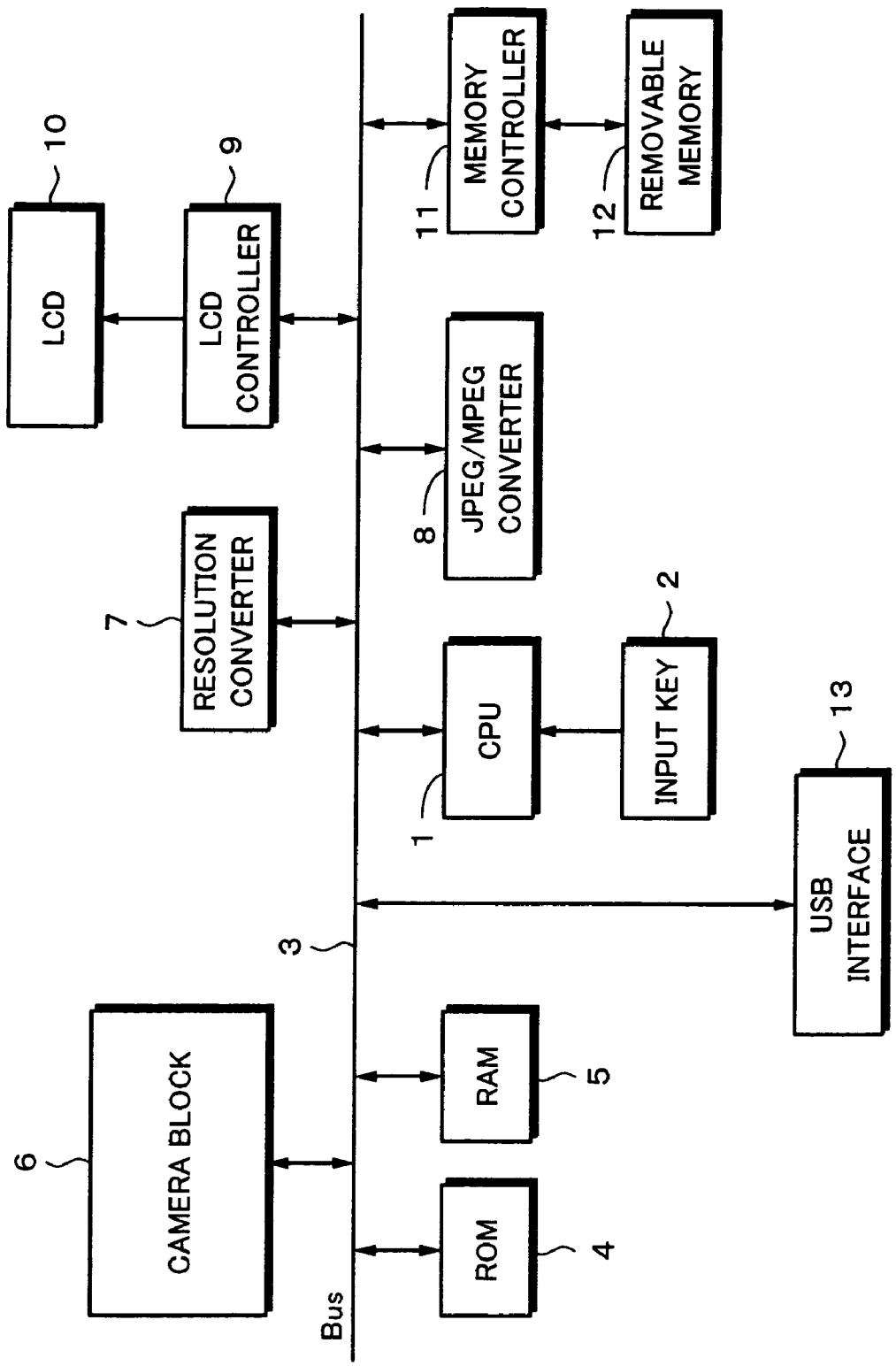
FIG. 1 is a block diagram showing a construction of a digital camera to which the invention is applied.

An embodiment of the invention will be described hereinbelow with reference to the drawings. FIG. 1 is a block diagram showing a construction of a digital camera to which the invention is applied. In FIG. 1, a CPU (Central Processing Unit) 1 controls the whole digital camera. An input key 2 is provided for the CPU 1. The input key 2 is used to receive an input from the user and includes a shutter key and keys for setting an operating mode. The CPU 1 is connected to a bus 3.

A ROM (Read Only Memory) 4 and a RAM (Random Access Memory) 5 are connected to the bus 3. A control program has been stored in the ROM 4. The RAM 5 is used as a work area.

A camera block 6 is constructed by a lens unit, an image pickup device, an iris, a DSP (Digital Signal Processor), and the like. The lens unit forms an image of object image light onto a photosensitive surface of the image pickup device. In a camera which realizes a small size and a light weight, a lens of a single-focal point is used as a lens unit. In the general camera, an auto-focusing mechanism is provided for the lens unit. There is also a camera in which an optical zooming mechanism is provided for the lens unit. The image pickup device photoelectrically converts the image of the object image light formed on the photosensitive surface of the image pickup device. As an image pickup device, a CCD (Charge Coupled Device) image pickup device or a CMOS (Complementary MOS) image pickup device is used. Color filters are arranged in front of the image pickup device. As a construction of a layout of the color filters, there are a case of using filters of the primary color system of R (red), G (green), and B (blue) and a case of using filters of the complementary color system Cy (cyan), Mg (magenta), and Ye (yellow). In the invention, a camera block having an arbitrary construction can be used. An output of the image pickup device is supplied to the DSP. A color image signal of three primary colors based on the object image light formed on the photosensitive surface of the image pickup device is formed by the DSP. The color image signal is converted into a digital signal by an A/D converter and sent to each unit through the bus 3.

A resolution converter 7 converts resolution of the image and is connected to the bus 3. The resolution converter 7 converts resolution of the image data from the camera block 6 or the image data recorded on a recording medium into the designated resolution. In the case of executing a printing process, the resolution of the stored image data is converted in accordance with a size or picture quality of the image to be printed. In the case of forming a thumbnail image, the thumbnail image is formed by the resolution converter 7.

A JPEG/MPEG converter 8 is hardware for executing processes to compression-encode (encode) the image data from the camera block 6 and decompress (decode) the compression-encoded image data and is connected to the bus 3. For example, JPEG is used as a compression system of the image data of a still image. The JPEG/MPEG converter 8 can execute not only the still image process but also a motion image process. In the case of the motion image process, MPEG is used as a compression system of the motion image. Naturally, the compression system of the still image and the motion image is not limited to the JPEG system or the MPEG system.

An LCD (Liquid Crystal Display) display 10 is used as an electronic view finder or the like upon photographing. The LCD display 1o is used to monitor the photographed image upon reproduction. The LCD display 10 is connected to the bus 3 through an LCD controller 9. Various setting states and operating modes are displayed on the LCD display 10.

A removable memory 12 is used to store the photographed image. The removable memory 12 is loaded through a memory controller 11. The memory controller 11 is connected to the bus 3. The removable memory 12 is a detachable non-volatile memory of a card type or a stick type using a flash memory. As such detachable flash memories, a memory stick (registered trademark), an SD memory card (registered trademark), a multimedia card (registered trademark), a compact flash (registered trademark), a smart media (registered trademark), and the like have been known. An arbitrary memory can be used as a removable memory 12. A magnetic disk, an optical disk, or a magnetooptic disk can be also used as a removable memory 12. The photographed image can be also stored in the flash memory built in the camera without using the detachable removable memory 12.

An interface 13 is used to connect the camera to various external apparatuses. The interface 13 is used to connect to, for example, a personal computer and transfer the image photographed by the camera to the personal computer. The interface 13 is used to connect to a printer and directly print the image photographed by the camera by the printer. For example, a USB (Universal Serial Bus) is used as an interface 13. The USB is a serial bus to connect peripheral devices. The interface 13 is not limited to the USB but IEEE1394 or UART (Universal Asynchronous Receiver-Transmitter) can be used. The interface is not limited to such wired interfaces but wireless connecting means such as "BlueTooth" can be also used. BlueTooth is a wireless network using frequency hopping using a band of 2.4 GHz. Data can be also transmitted by infrared rays by using IrDA (Infrared Data Association).

A lens of the camera block 6 is directed toward the object upon photographing. The object image light is photoelectrically converted into a digital signal by the image pickup device of the camera block 6. The image data from the camera block 6 is sent to the resolution converter 7. The resolution is converted in accordance with the number of pixels of the LCD display 10 and held in a finder area in the RAM 5. The image data in the finder area in the RAM 5 is sent to the LCD display 10 at a period of 1/30 second. A display image which is being photographed is displayed on the LCD display 10 and the LCD display 10 becomes an electronic view finder.

Upon photographing of the still image, the user sets the operating mode to a still image mode. While looking at the LCD display 10 as an electronic view finder, the user sets the direction of the camera. When the image to be photographed is determined, the user presses the shutter key. The shutter key is included in the input key 2. When the shutter key is pressed, the image data of the camera block 6 at that time is fetched as image data of a bitmap. This bitmap image data is converted into desired resolution by the resolution converter 7. The image data is compressed by, for example, the JPEG system by the JPEG/MPEG converter 8 and stored as a JPEG file into the removable memory 12, or the image data whose resolution has been converted into desired resolution is held as bitmap data as it is and stored as a bitmap file into the removable memory 12.

Upon reproduction of the still image, the desired image data is read out from the removable memory 12. If the image data stored in the removable memory 12 has been compressed by, for example, the JPEG system, the image data read out from the removable memory 12 is sent to the JPEG/MPEG converter 8 and returned to the original bitmap image by the JPEG/MPEG converter 8. The image data is sent to the resolution converter 7 and the resolution is converted in accordance with the number of pixels of the LCD display 10. If the image data held in the removable memory 12 is the bitmap data, the image data stored in the removable memory 12 is sent to the resolution converter 7 and the resolution is converted in accordance with the number of pixels of the LCD display 10. This image data is held in the finder area in the RAM 5. The image data in the finder area in the RAM 5 is sent to the LCD display 10. The image read out from the removable memory 12 is displayed on the LCD display 10.

Upon photographing of the motion image, the user sets the operating mode to a motion image mode. While looking at the LCD display 10 as an electronic view finder, the user sets the direction of the camera. When the user presses the shutter key, the recording of the motion image is started. By pressing the shutter key again, the recording of the motion image is finished. Upon recording of the motion image, the image data of the camera block 6 is fetched as image data of a bitmap. This bitmap image data is compressed by, for example, the MPEG system by the JPEG/MPEG converter 8 and stored as an MPEG file into the removable memory 12.

Upon reproduction of the motion image, the desired motion image data compressed by the MPEG system is read out. The motion image data held in the removable memory 12 is sent to the JPEG/MPEG converter 8 and decoded by the JPEG/MPEG converter 8. This image data is sent to the LCD display 10. The motion image read out from the removable memory 12 is displayed on the LCD display 10.

Further, in the digital camera to which the invention is applied, the printer is connected to the interface 13 and the image stored in the removable memory 12 can be directly printed by the printer.

Figure 2:
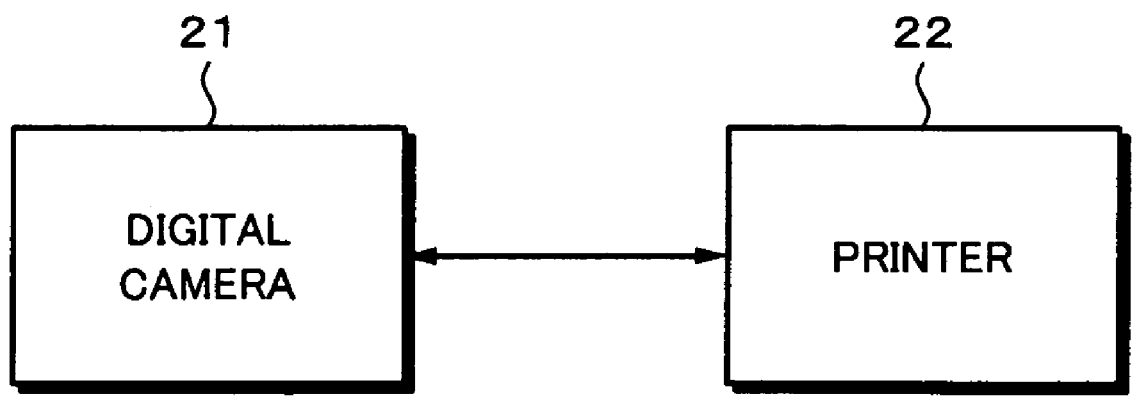
FIG. 2 is a block diagram showing a connection of the digital camera and a printer.

That is, as shown in FIG. 2, a digital camera 21 to which the invention is applied and a printer 22 are connected by using, for example, a USB cable. A printer of an arbitrary type can be used as a printer 22. When the user connects the digital camera 21 to the printer 22, sets a printing mode, and designates a desired image, a print command and its option and, further, the image data of the designated image are transmitted from the digital camera 21 side to the printer 22. On the basis of them, the image is printed by the printer 22.

In the digital camera to which the invention is applied, when the digital camera 21 and the printer 22 are connected, not only the still image can be printed but also the image of a desired frame can be extracted from the motion image and printed.

In the case of printing of the desired frame in the motion image, the user selects a desired motion image and reproduces it. Upon reproduction of the motion image, the desired motion image data compressed by the MPEG system is read out from the removable memory 12. This motion image data is decoded by the JPEG/MPEG converter 8 and the corresponding image is displayed on the LCD display 10. While reproducing the motion image on the LCD display 10 of the digital camera, the user executes the operation such as pause, fast-forward, rewind, frame feeding, frame return, or the like and selects the frame to be printed.

When the user specifies the print frame, a desired frame position is stored in the RAM 5. The following two kinds of information of motion image file specific information and selection frame position information are necessary to specify the frame position.

The motion image file specific information is peculiar data to identify a specific motion image file from a plurality of motion image files and is ordinarily a file name. The selection frame position information is information to specify which frame in the motion image file is printed and it is a frame number or byte position from the head.

The number of frames which can be selected by the user is not limited to 1. The user can select a plurality of frames from a plurality of motion image files.

When the selection of one print frame is finished, for example, characters "further selected?" are displayed on the LCD display 10. When the user selects "Yes", the print frame can be subsequently selected by a similar process. In this manner, the user can select a plurality of print frames. When he selects "No" in response to the indication of "further selected?", the selection of the print frames is finished.

As a method other than the method whereby the user selects the print frames one by one while actually looking at the motion image, the following methods of automatically selecting the print frames are considered.

A change point of a scene is automatically detected and selected as a print frame.

Frames of a specific time interval are selected as print frames (for example: frames of every hour).

The change point of the scene can be discriminated by detecting a correlation of the frames. If the correlation of the frames decreases, this point can be discriminated as a change point of the scene.

When the print frames are selected, the user designates a print format. As a print format, for instance, there is printing of each frame, printing in an index format in which a plurality of thumbnail images are arranged, or the like. This format is equivalent to the format which can be selected upon printing of the still image.

When the print format is designated, the printing is executed. Upon execution of the printing, the motion image data including the frame selected as a print frame is read out from the motion image data held in the removable memory 12. This motion image data is sent to the JPEG/MPEG converter 8 and decoded by the JPEG/MPEG converter 8. The data of the frame selected as a print frame is extracted from the motion image data.

At this time, by reading out the byte position of the frame from the frame position information and seeking the inside of the file, the frame is specified. A still image is formed from the image data of the print frame and the still image data corresponding to the print frame is developed into the print area in the RAM 5. When a plurality of print frames are selected, the similar process is repeated and the still image data corresponding to the plurality of print frames is developed into the print area in the RAM 5.

In the case of printing index image data, an index image is formed by the resolution converter 7 and this index image data is developed into the print area in the RAM 5.

A print command is sent from the digital camera 21 to the printer 22 and the image data of the still image corresponding to the print frame developed in the RAM 5 is sent to the printer 22. The printer 22 prints the image data sent from the digital camera 21.

As mentioned above, in the embodiment of the invention, the digital camera 21 and the printer 22 are directly connected and the image photographed by the digital camera 21 can be printed without using the personal computer. The apparatus has the functions for designating image of the desired print frame from the motion image photographed by the digital camera, forming the still image of the image of this print frame, and sending it to the printer. Therefore, not only the still image but also the desired frame in the motion image can be printed. Since the still image of the image of the print frame is formed from the motion image and sent to the printer, the printer can print by the process similar to the printing process for the still image and execute the printing without being aware of the motion image format.

Figure 3:
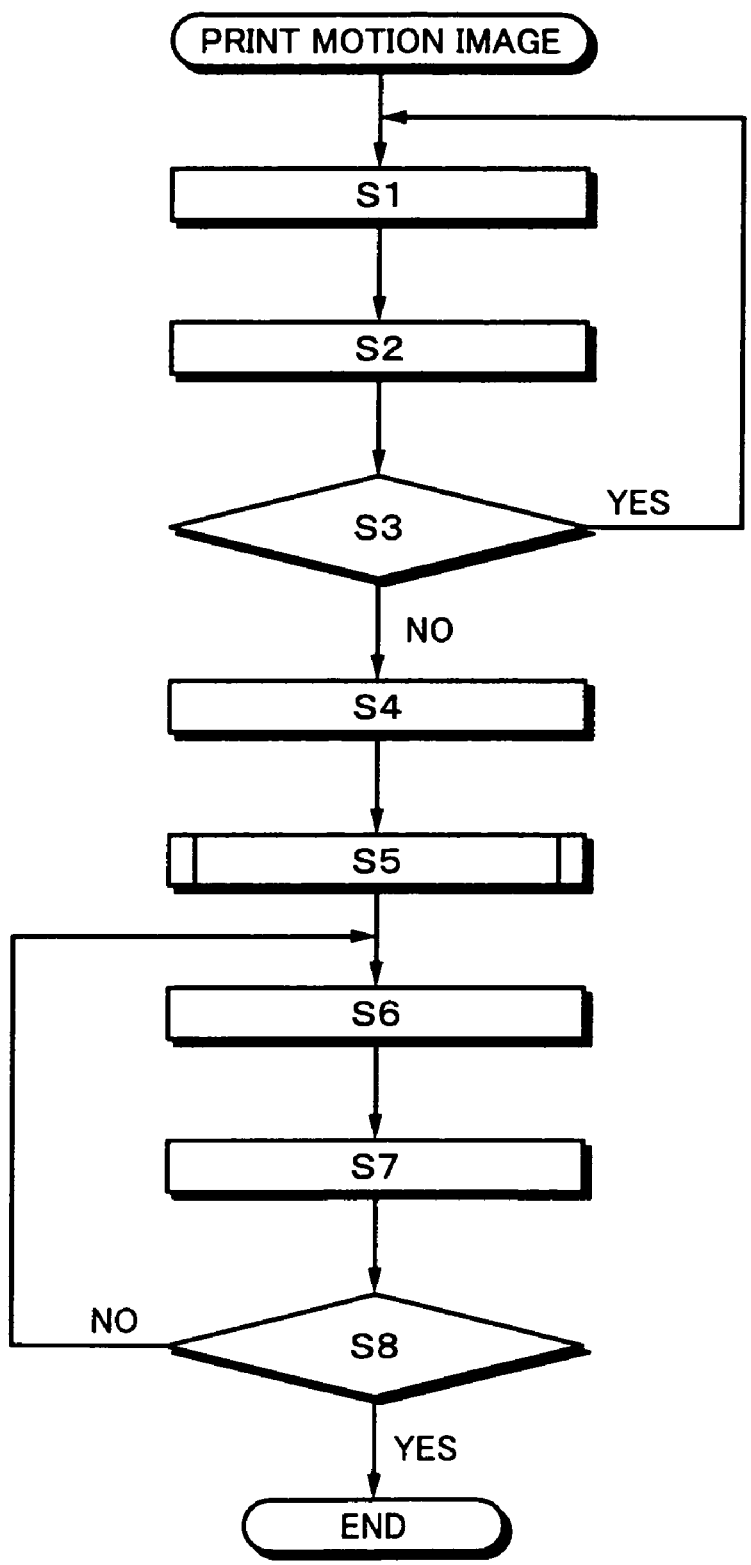
FIG. 3 is a flowchart which is used for explanation of the digital camera to which the invention is applied.

FIG. 3 is a flowchart showing the selecting process of the print frame. In FIG. 3, the motion image frame is selected (step S1). Upon selection of the motion image frame, while reproducing the motion image on the LCD display 10 of the digital camera, the user executes the operation such as pause, fast-forward, rewind, frame feeding, frame return, or the like and selects the frame to be printed.

When the user specifies the print frame, the frame position information is stored in the RAM 5 (step S2). The frame position information is information necessary to specify the selected frame position and is constructed by the motion image file specific information (for example, file name) and the selection frame position information (for example, the frame number or byte position from the head).

When the print frame is specified, whether or not the print frame is further selected is discriminated (step S3). Further, in the case of selecting the print frame, the processing routine is returned to step S1 and the process to specify the print frame is repeated.

If it is determined in step S3 that the selection of the print frame has been finished, the print format is designated (step S4). For example, a format of the frame image or a format of the index image can be designated as a print format.

When the print format is designated, the printing is executed (step S5). A still image is formed from the motion image frame by the execution of the printing and developed in the RAM 5 (step S6). This still image is sent to the printer (step S7). Thus, the still image formed from the motion image frame is printed by the printer.

Whether or not the printing of the selected number of sheets has been completed is discriminated (step S8). If the printing of the selected number of sheets is not completed, the processing routine is returned to step S6 and the printing of the still image formed from the motion image frame is continued. After completion of the printing of the selected number of sheets, the processing routine is finished here.

FIG. 4 is a flowchart showing the process for executing the printing in step S5. In FIG. 4, when the printing of the motion image frame is executed, the frame position information held in step S2 is read (step S11). This frame position information is constructed by the motion image file specific information (for example, file name) and the selection frame position information (for example, the frame number or byte position from the head).

The file is specified from the motion image file specific information (for example, file name) and this file is opened (step S12). The frame is specified from the selection frame position information (for example, the frame number or byte position from the head) (step S13).

The motion image file opened in step S12 is decoded (step S14). The still image file in the position designated in step S11 is fetched as bitmap data into the RAM 5 (step S15).

If the printer receives only the input format of the specific compression system (for example, JPEG), the operation to encode the bitmap image developed in the RAM 5 into the specific compression system (for example, JPEG) by the JPEG/MPEG converter 8 is necessary. In this case, a process for encoding the bitmap image into the image of, for example, the JPEG system is executed as necessary after step S15.

As described above, in the embodiment of the invention, the motion image frame can be easily printed without moving the media. The printer can print the specific frame of the motion image by a method similar to that for the still image without being aware of the motion image format. As a method other than the method whereby the user selects the target frame while looking at the motion image, by providing a function for automatically printing the frames of a predetermined time interval and the frame at the change point of the scene, practicality is improved. For example, in a system such as a security camera, by providing functions for automatically detecting the frame at the change point of the scene and printing, the operation for selecting the frame while looking at a motion image whose change is small is unnecessary. In the case where astrophotograhy is executed, it is considered that it is convenient to print the frames of a predetermined time interval.

The invention is not limited to the foregoing embodiment but various modifications and applications are possible within the scope of the invention without departing from the spirit of the invention.

According to the invention, the digital camera and the printer are directly connected and the image photographed by the digital camera can be printed without using the personal computer. The apparatus has the functions for designating the image of the desired print frame from the motion image photographed by the digital camera, forming the still image of the image of this print frame, and sending it to the printer. Therefore, not only the still image but also the desired frame in the motion image can be printed. Since the still image of the image of the print frame is formed from the motion image and sent to the printer, the printer can print by the process similar to the printing process for the still image and execute the printing without being aware of the motion image format.

The invention claimed is:

1. A digital camera apparatus comprising:
   first storing means for storing image data;
   interface means for connecting the digital camera with a printer;
   image pickup means for photographing an object image;
   second storing means for storing photographed still image data and motion image data; and
   control means for controlling the first storing means, the interface means, the image pickup means, and the second storing means,
   wherein a plurality of frames are sequentially designated for printing, and each time when a designation of a frame is finished, the control means inquiries whether a designation of another frame is intended, wherein the control means automatically detects a change point of frames of the motion image data according to a correlation of the frames, and wherein when a frame to be printed in the motion image data stored in said second storing means is designated, position information of said designated frame to be printed is stored, and the motion image data is read out from said second storing means on the basis of said stored position information of the frame, and the still image data is formed from the motion image data of the frame which is specified by said frame position information in said motion image data, and said formed still image data is transmitted to said printer through said interface, wherein the position information includes a byte position of the designated frame, and wherein frames of a predetermined interval are extracted from the motion image data for selection.

2. The digital camera apparatus according to claim 1, wherein said position information of the frame is constructed by motion image file specific information and the selection frame position information.

3. The digital camera apparatus according to claim 2, wherein said motion image file specific information is a file name and said selection frame position information is a frame number or byte position.

4. The digital camera apparatus according to claim 1, wherein a plurality of said frames to be printed is designated.

5. The digital camera apparatus according to claim 1, wherein said frame to be printed is designated by a user while viewing a reproduced display screen.

6. The digital camera apparatus according to claim 1, wherein said frame to be printed is designated each designated time interval.

7. The digital camera apparatus according to claim 1, wherein said frame to be printed is designated by a frame at a change point of a scene.

8. The digital camera apparatus according to claim 1, wherein when the motion image data stored in said second storing means is printed, a print format of the image is designated.

9. The digital camera apparatus according to claim 8, wherein said print format is a print format of each frame.

10. The digital camera apparatus according to claim 8, wherein said print format is an index image format.

11. The digital camera apparatus according to claim 1, wherein the still image data of the frame specified by said frame position information in said motion image data is encoded and output to said printer.

12. A printing method for printing image data of a digital camera apparatus storing motion image data, the printing method comprising the steps of:

connecting the digital camera apparatus with a printer;

automatically detecting a change point of frames of the motion image data according to a correlation of the frames;

designating a frame in the motion image data;

forming a still image out of the designated frame;

transmitting the formed still image to the printer; and printing the formed still image, wherein a plurality of frames are sequentially designated for printing, and each time when a designation of a frame is finished, whether a designation of another frame is intended is inquired, wherein the camera apparatus reproduces and stores both photographed still image data and motion image data, wherein when a frame to be printed in the motion image data is designated, position information of said designated frame to be printed is stored, and the motion image data is read out on the basis of said stored position information of the frame, and the still image data is formed from the motion image data of the frame which is specified by said frame position information in said motion image data, and said formed still image data is transmitted to said printer, wherein the position information includes a byte position of the designated frame, and wherein frames of a predetermined interval are extracted from the motion image data for selection.

13. The printing method according to claim 12, wherein said position information of the frame is constructed by motion image file specific information and the selection frame position information.

14. The printing method according to claim 13, wherein said motion image file specific information is a file name and said selection frame position information is a frame number or byte position.

15. The printing method according to claim 12, wherein a plurality of said frames to be printed is designated.

16. The printing method according to claim 12, wherein said frame to be printed is designated by a user while viewing a reproduced display screen.

17. The printing method according to claim 12, wherein said frame to be printed is designated each designated time interval.

18. The printing method according to claim 12, wherein said frame to be printed is designated by a frame at a change point of a scene.

19. The printing method according to claim 12, wherein when the stored motion image data is printed, a print format of the image is designated.

20. The printing method according to claim 19, wherein said print format is a print format of each frame.

21. The printing method according to claim 19, wherein said print format is an index image format.

22. The printing method according to claim 12, wherein the still image data of the frame specified by said frame position information in said motion image data is encoded and output to said printer.

* * * * *